United States Patent [19]
d'Alayer de Costemore d'Arc

[11] Patent Number: 5,581,431
[45] Date of Patent: Dec. 3, 1996

[54] PLAYBACK/RECORDING UNITS WITH SINGLE POWER SOURCE SELECTIVELY POWERING ALL OPERATING FUNCTIONS

[75] Inventor: Stephane M. A. d'Alayer de Costemore d'Arc, Genappe, Belgium

[73] Assignee: Staar S.A., Brussels, Belgium

[21] Appl. No.: 377,824

[22] Filed: Jan. 25, 1995

[30] Foreign Application Priority Data

Feb. 9, 1994 [BE] Belgium ................... 9400149

[51] Int. Cl.$^6$ .................................. G11B 5/008
[52] U.S. Cl. .............. 360/137; 360/96.2; 360/96.5
[58] Field of Search ...................... 360/85, 95, 137, 360/96.2, 96.5

[56] References Cited

U.S. PATENT DOCUMENTS

| | | | |
|---|---|---|---|
| 3,554,465 | 1/1971 | Murakawa | 242/201 |
| 4,446,496 | 5/1984 | Osanai | 360/74.1 |
| 4,546,396 | 10/1985 | Schatteman | 360/96.5 |
| 4,704,643 | 11/1987 | Matsuoka et al. | 360/71 |
| 4,791,505 | 12/1988 | Takai et al. | 360/137 |
| 5,043,832 | 8/1991 | Ueda et al. | 360/99.07 |
| 5,058,095 | 10/1991 | Kawakami et al. | 369/77.1 |
| 5,136,442 | 8/1992 | Yamashita | 360/96.5 |
| 5,331,484 | 7/1994 | Klos-Hein et al. | 360/96.5 |

*Primary Examiner*—Stuart S. Levy
*Assistant Examiner*—William J. Klimowicz
*Attorney, Agent, or Firm*—Leydig, Voit & Mayer

[57] ABSTRACT

A playback/recording apparatus, which operates with a recording tape medium, having a playback/recording head and tape driving capstan/pinch rollers mounted in cooperative relation, a loading/unloading mechanism which loads and unloads the tape medium between a loading/unloading position and an operative position associated with the playback/recording head and tape driving capstan/pinch rollers, a single power source, a mobile element which is driven by the power source along a linear path in forward and return stroke movements, the power source being controlled to shift the mobile element to different locations along its linear path responsive to a function change instruction to the power source, a selectively operated ratchet for connecting the mobile element to operate the loading/unloading mechanism in the course of a loading and unloading phase of the forward and return stroke movements to load and unload a tape medium, and a connection from the mobile element to set the reversal mechanism which is operated by the mobile element responsive to movement to certain of its locations to reverse travel direction of the tape medium, the mobile element being directly movable from any one location to another responsive to a function change instruction to the power source.

10 Claims, 3 Drawing Sheets

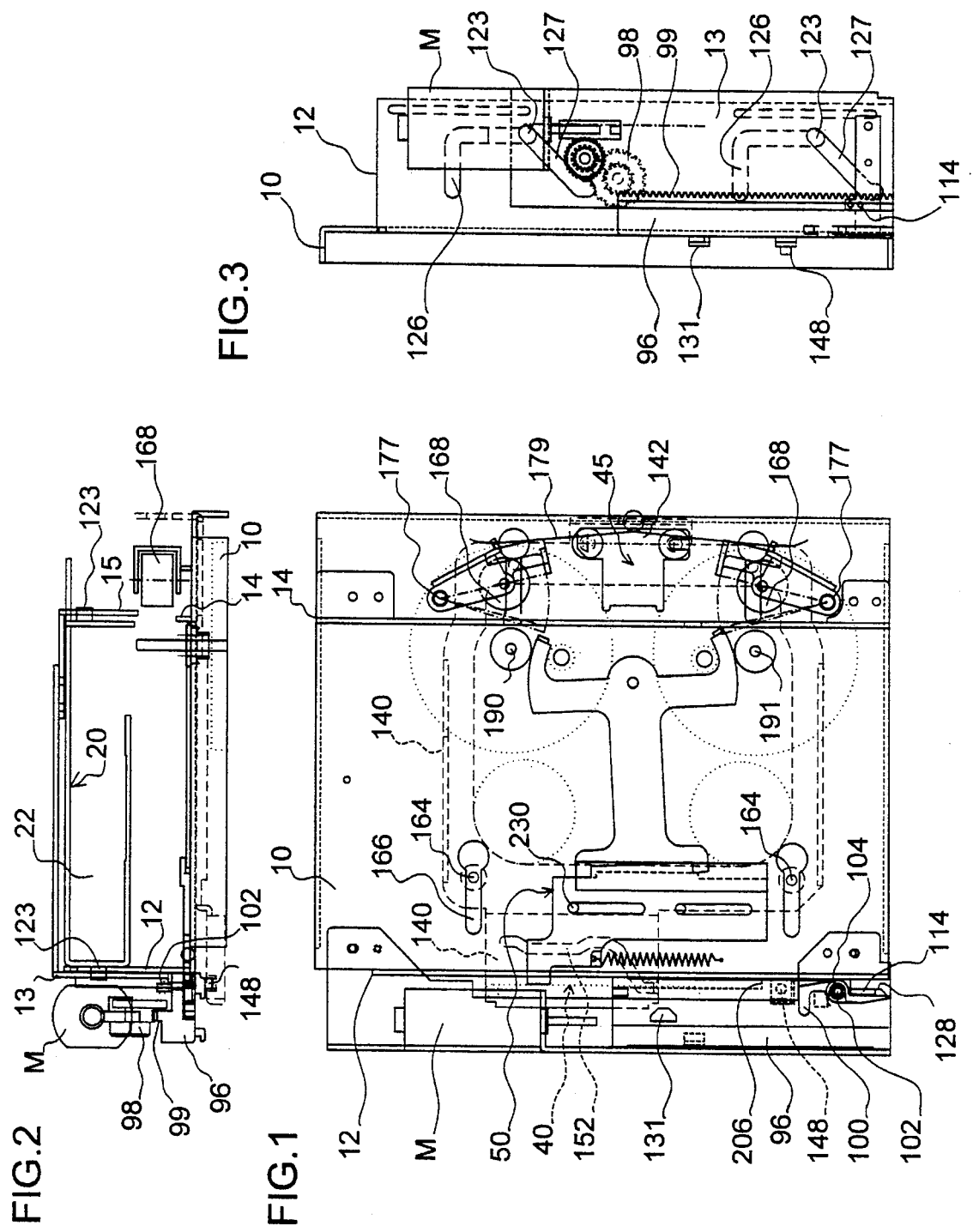

PLAYBACK/RECORDING UNITS WITH SINGLE POWER SOURCE SELECTIVELY POWERING ALL OPERATING FUNCTIONS

The present invention relates to playback/recording units for recording medium such as magnetic tape in cassettes or cartridges and, more particularly, control of and powering operating functions of such units.

In past years, such units had a dedicated power source for each of their main mechanisms which provide the units with their operating functions: loading/unloading recording medium; playback/recording at normal speed; stop, pause, fast speed; recording medium direction reversal. For cost and size considerations, it is desired to reduce the number of power sources, for instance by associating them with selection devices such as solenoids, clutches, and the like, so that the same power source can be used for powering two distinct mechanisms.

U.S. Pat. No. 5,058,095 discloses a device powering a turntable and also ensuring loading or unloading of a disc relative to the turntable. The selection of the mechanism driven by the device (a motor) is achieved by a mechanical clutch actuated by means such as a relay or a solenoid.

U.S. Pat. No. 5,136,442 discloses a similar device incorporated in a unit for magnetic tape enclosed in a cassette.

U.S. Pat. No. 5,043,832 also discloses a device ensuring loading of a cassette of magnetic tape in the unit and then the loading of the tape around the playback/recording means. Here, the device has a single axle and a worm which can either slide on or be rotated by the axle to provide a clutch.

In summary, such devices require use of clutching means to activate the mechanism which should be driven and, furthermore, they do not always ensure the flexibility of operation provided by independent powering or driving means. For example, they do not control or power all the various functions of a playback/recording unit.

It is thus necessary to add to the devices proposed in the above-mentioned patents either another independent powering or driving means, or electro-mechanical means such as solenoids, to ensure the different functions, with the result that to ensure the performance of all functions it becomes necessary to increase the number of components of the unit.

Simplification of playback/recording units to facilitate their assembly and obtain as much as possible low production-cost is becoming more-and-more an important criteria for successful units from a commercial standpoint.

The principal aim of the present invention is to satisfy such criteria by providing playback/recording units having a single power source constructed and arranged as to power the mechanisms thereof to provide all the operating functions.

A related object of the invention is to provide such a single power source which has an extremely simple construction and arrangement to power the mechanisms of the units.

Another aim of the invention is to provide means which allow remote-control of all functions of playback/recording units without large mechanical movement of and/or direct link from control buttons.

Another aim of the invention is to provide auto-actuating means; i.e. means which do not require any external actuation other than the selection by the user of the desired function.

Other advantages and details of the invention will become evident from the detailed description, given herebelow, of a preferred embodiment to which modifications can be brought without departing from the spirit and scope of the invention, taken in conjunction with the accompanying drawings, in which:

FIG. 1 is a top view of a playback/recording unit for a cassette of magnetic tape, in loading position for a cassette (which is not shown) in the tray of the loading/unloading mechanism;

FIG. 2 is a front view of the unit as shown in FIG. 1;

FIG. 3 is a lateral view from the left side of the unit as shown in FIG. 1;

Figure 4:
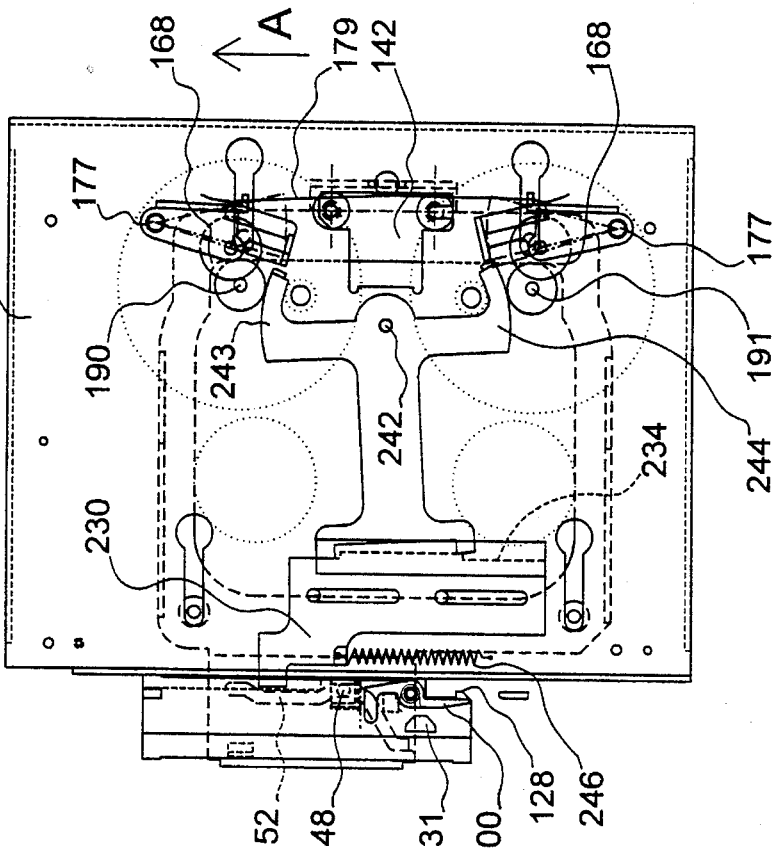
FIG. 4 is a view similar to FIG. 1, the tray for the cassette having been set in operative position by the loading/unloading mechanism.

In order to keep the figures as simple and clear as possible and to facilitate the understanding of the operation of the invention, only the essential elements have been represented in the figures.

Referring to FIGS. 1–6, a playback/recording unit is shown for magnetic tape enclosed in a cassette and, in particular, the unit can accommodate analog cassettes such as the so-called "compact cassette" and also digital cassettes such as the so-called "dcc". The unit has a main frame 10, having vertical walls 12,14 for guiding a loading/unloading mechanism 20 which has lateral interconnected movable walls 13,15 and a tray 22 to carry the cassette between a loading position and an operative position and thereby provides the unit with cassette loading and unloading functions. The loading/unloading mechanism is of the type described in commonly assigned U.S. Pat. No. 4,546,396.

In accordance with this invention, a tape control mechanism 40 sets the tape drive means for the magnetic tape and the playback/recording elements 45 in different modes to provide the unit with playback/recording at normal speed, stop, pause, and fast speed functions. A tape reversal mechanism 50 controls travel direction of the magnetic tape to provide the unit with a tape direction reversal function.

On one of its lateral sides, the frame 10 is shaped to support a motor M which provides, in keeping with the invention, a single power source selectively interconnected to power the mechanisms 20,40,50 to carry out all said functions of the unit. To this end, the motor M powers a mobile control element or member 96 through a gear-train 98 and a rack 99 mounted on the control member, the movement of the control member 96 being in forward and return strokes along a linear path to different locations, to move and thereby operate these mechanisms to provide all such functions.

Figure 8:
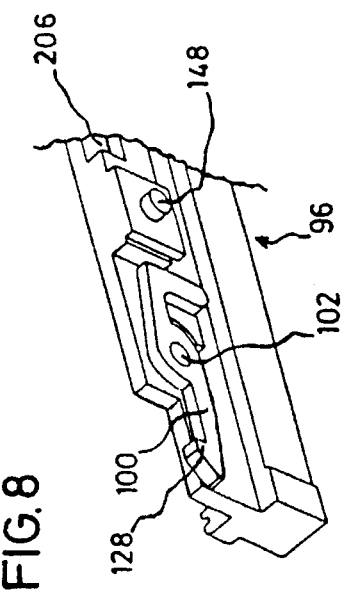
FIG. 8 is a partial perspective view from the bottom of a control member which selectively connects a single power source to the mechanisms of the unit.

The control member 96 is selectively interconnected to move the loading/unloading mechanism 20 during a loading and unloading phase of its forward and return stroke movement by a ratchet 100 (FIG. 8) mounted on the control member 96. The ratchet 100 is mounted to pivot about the axis 102 and is urged counter-clockwise (as viewed from above) by a pin spring 104.

The ratchet 100 links a lug 114 attached to a lateral movable plate 13 of the loading/unloading mechanism 20 to the movement of the control member 96. As a consequence, when the motor M is powered in one direction and translates the control member 96 in a forward stroke from the position shown in FIG. 1 to the position shown in FIG. 4, it drives during this translation movement the tray 22 of the loading/ unloading mechanism 20 to load the cassette in the unit and, when the motor M is powered in the reverse direction and translates the control member 96 in a return stroke from the position shown in FIG. 4 to the position shown in FIG. 1, it drives the tray 22 of the loading/unloading mechanism to unload the cassette.

The tray 22 of the loading/unloading mechanism 20 is moved by translation of the control member 96 horizontally to carry the cassette into the unit and vertically (downward in FIG. 2) to carry the cassette into proximity of reel hub take-up drive elements and playback/recording elements 45 when in the operative position. To move the tray 22 in the horizontal and vertical paths, the tray 22 bears laterally extending studs 123 on both opposite sides (FIG. 2) cooperating with slots 126 having an inverted L-shape (FIG. 3) provided in the fixed vertical walls 12,14 and also with angled slots 127 provided in lateral movable plates 13,15 bearing against the fixed vertical walls 12,14. The control member 96 is selectively connected to the movable plate 13 by the ratchet 100 for the loading function when it is in its counter-clockwise position as shown in FIG. 1 wherein a hook 128 at the end of the ratchet 100 engages the lug 114 integral with the movable plate 13. For a further, more detailed, description of the loading/unloading system, reference can be made to U.S. Pat. No. 4,546,396 which is incorporated by reference.

Movement of the lug 114 by the control member 96 causes simultaneous movement of both movable plates 13,15 which are rigidly connected, and the interaction between the slots 126,127 provides movement of the loading/unloading mechanism and of the tray 22, first horizontally and then vertically between the loading (FIG. 1) and operative (FIG. 4) positions of the unit.

When the control member 96 comes close to the position represented in FIG. 4, a shoulder 131 mounted on the main frame 10 is engaged by a forward portion of the ratchet 100 causing it to pivot around its axis 102 against the force of the pin spring 104 and unlocks the lug 114. As shown in FIG. 4, the movable plate 13 is then free and the loading/unloading mechanism is kept in this position by resilient means, the cassette being then in operative position.

In carrying out the invention, means are also provided connecting the control member 96 to set the playback/ recording elements 45 and tape drive means in different cooperative relations responsive to movement of the control member 96 to different locations spaced from the loading and unloading phase. For this purpose, upon further translation of the control member 96 to locations shown in FIGS. 5,6,7 the control member 96 actuates the tape control mechanism 40, which includes a movable frame 140 and playback/recording head 142 carried thereby, by means of a stud 148 which is carried by the control member 96 (FIG. 8) which enters and moves along a cam groove 152 provided in the movable frame 140 (FIG. 7), and the tape reversal mechanism 50.

As shown in FIGS. 4–7, the entrance to the cam groove 152 is somewhat V-shaped so as to ensure entry of the stud 148 into the cam groove 152 which has straight and angled sections between different locations (labelled in FIG. 7) corresponding to playback/recording at normal speed, pause, and fast speed functions. The movable frame 140 is mounted on the fixed main frame 10 and is guided in horizontal translation (left-to-right as viewed in FIGS. 1 and 4) through an arrangement of studs 164 mounted on the movable frame 140 and slots 166 provided in the fixed main frame 10, the direction of translation movement being perpendicular to the direction of movement of the control member 96. As shown, pinch rollers 168 are carried on support arms pivotally mounted on the main frame 10 about the axis 177 and are movable under the influence of resilient means 179 to cooperate with capstans 190 or 191 according to the direction of tape movement desired.

Figure 5:
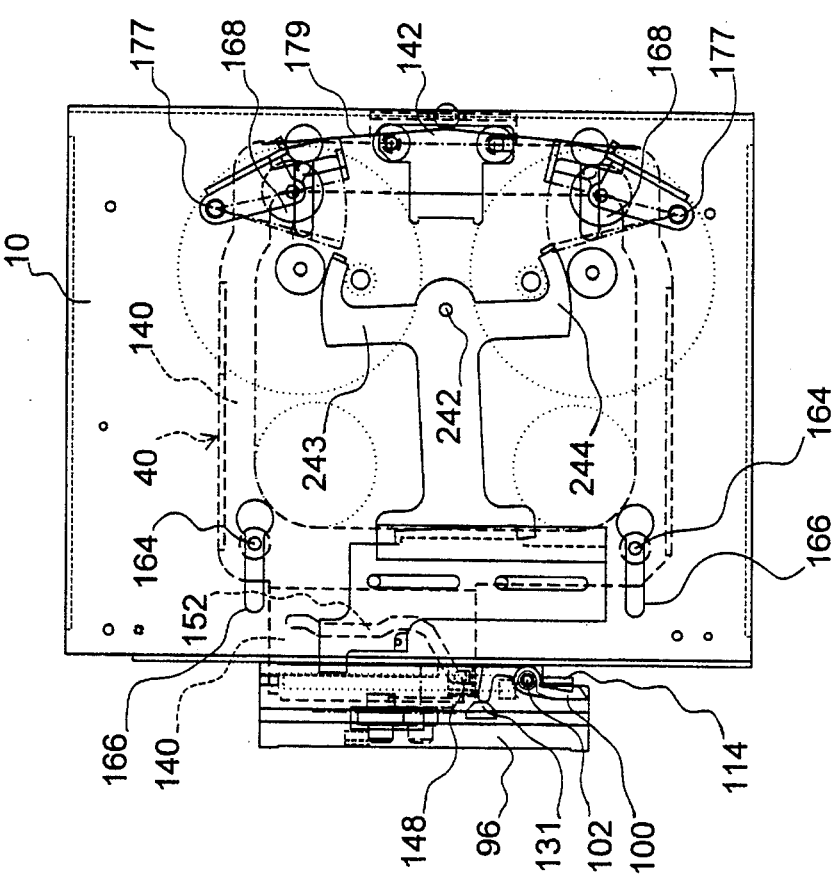
FIG. 5 is a view similar to FIGS. 1 and 4, the unit being in playback mode.
Figure 6:
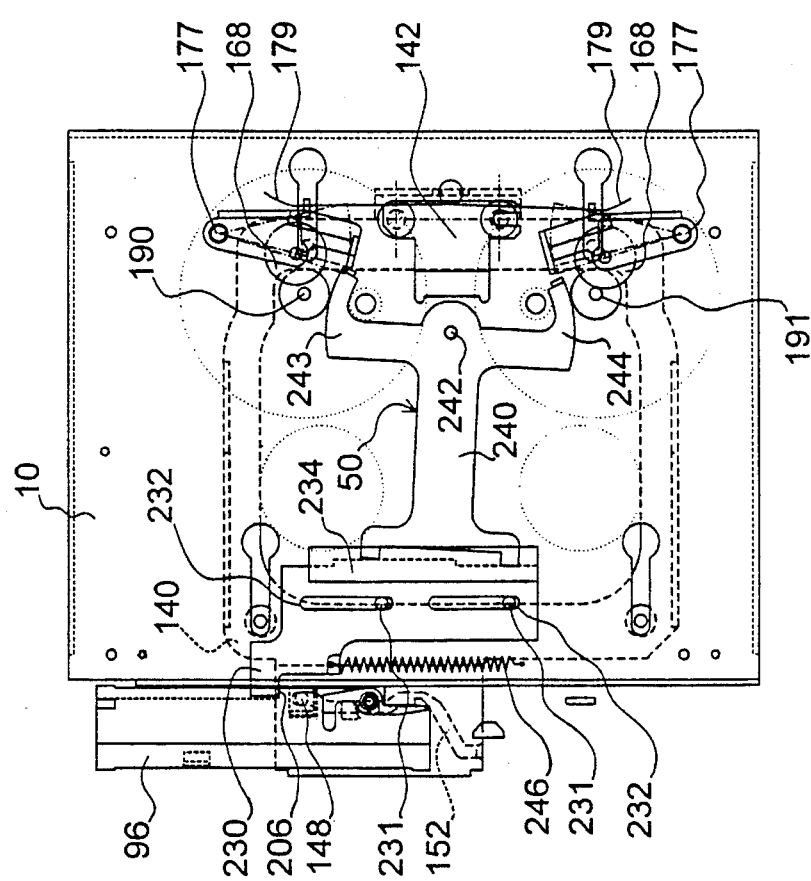
FIG. 6 is a view similar to FIGS. 1, 4 and 5, the unit being still in playback mode but with the tape being driven in a direction opposite to the direction shown in FIG. 5.

The movable frame 140 carries the playback/recording head 142 and, when shifted responsive to movement of the control member 96 via the stud 148 and cam groove 152, causes the pivoting of the support arms for the pinch rollers 168 about their respective axis 177 so that the magnetic tape is pressed against one of the capstans 190,191 to obtain travel at the appropriate speed for playback or recording functions (FIGS. 5,6).

Figure 7:
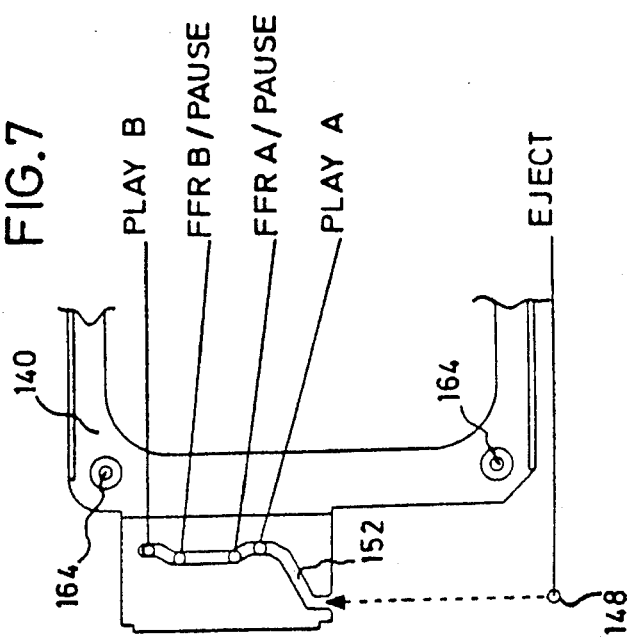
FIG. 7 is a partial plan view of an element of a tape control mechanism of the unit.

The movement of the stud 148 on the control member 96 along the angled sections of the cam groove 152 to the different locations (see FIG. 7) along the groove shifts the movable frame 140 and sets the pinch rollers 168 and playback/recording elements 45 in different cooperative relations; by slightly removing the operative pinch roller 168 from the operative capstan 190 or 191 and the recording/ playback head 142 the tape is free for fast forward or reverse, or pause, functions; this is achieved by controlling the motor M to move the control member 96 and thereby the stud 148 along the angled sections of the cam groove 152 from the playback/recording speed position (play a or play b, FIG. 7) to the fast forward or reverse and pause position (ffr a [pause], ffr b [pause], FIG. 7).

In summary, these different functions are provided responsive to movement of the control member 96 and thus of its stud 148 along the cam groove 152 in the movable frame 140 (FIG. 7); the motor M is controlled by push buttons or similar manual control elements to rotate in one direction or reverse by appropriately switched connections to its power supply to drive the control member 96 to the different locations along its linear path, represented by the locations labelled in FIG. 7. It is an important feature of the invention that the linear location of the control member 96 can be changed at any moment during operation of the unit by forward or reverse rotation of the motor M responsive to change function instructions provided either automatically or directed by a user manipulating control elements such as push buttons. The control member 96 is movable in forward or reverse steps directly from one of its different locations to another to shift the playback/recording and tape driving means from one operating mode to another. Furthermore, the control member 96 (by reversing rotation of the motor M through the gear train 98 and rack 99) is fully and directly returnable from any of its operating locations to the starting-end of its stroke to unload (eject) a cassette; an unload function instruction or function change instruction can be given to eject a cassette from the unit quickly at any time while the unit is operating in any of its modes, or to change from one mode to another, providing the user with a "feeling" that each change in function is directly controlled by its own independent power source while, as has been explained, all operating functions are provided by a single power source.

During its movement between the "a" locations and the "b" locations in FIG. 7, the control member 96 operates the tape reversal mechanism 50 (FIG. 6) controlling the reversal of the tape travel direction. For this purpose, the control member 96 bears a lug 206 (see FIGS. 1,6,8) which engages a lateral extension projecting from one side (the left-hand side in FIG. 6) of a slider 230 which is independently mounted for translation on the main frame 10 through the cooperation of studs 231 mounted on the main frame 10 and slots 232 provided in the slider 230.

On its opposite (right-hand) side, the slider 230 bears a profile 234 cooperating with a balanced lever 240 mounted on the main frame 10 and pivoting about the axis 242. This lever 240 bears two lugs 243,244 each cooperating with a support arm for a pinch roller 168 so that simultaneously one of the pinch rollers 168 is removed from engagement with its associated capstan 191 (FIG. 5) while the other one presses the magnetic tape against its adjacent capstan 190 (FIG. 5) so as to ensure travel of the tape in a determined direction (direction A, FIG. 5; play a, FIG. 7).

Pivotal movement of the lever 240 ensures travel of the tape in the opposite direction (B, FIG. 6; play b, FIG. 7). As can be seen in FIG. 6, this pivotal movement of the lever 240 is caused when the lug 206 moves the slider 230 against the resilient means 246 which brings it back to its stable position as shown in FIGS. 4 and 5. Such pivotal movement is powered preferably when the pinch rollers 168 are slightly disengaged from their capstans 190,191 (FIG. 7- between ffra and ffrb positions), and the head 142 from the tape, thus at a time where influence of the resilient means 179 is reduced so that pivotal movement just requires a very low torque for its actuation.

During the final phase of movement of the control member 96 which shifts the stud 148 along the groove 152 from the position labelled ffr b (pause), in which the pinch rollers 168 are slightly removed from both capstans 190,191, to the position labelled play b, one of the pinch rollers 168 is moved into engagement with the operative capstan 191 (FIG. 6) to produce movement of the magnetic tape at playback/recording speed in the travel direction B.

Translation movement of the control member 96 is produced by the motor M through the drive connection herein shown as a worm, gears 98 and rack 99. To obtain forward and return movement of the control member 96 from any of its locations to another it is preferred to reverse the polarity of the power supply to the motor M; when the drive direction is reversed, the control member 96 is displaced from the end of the stroke in which it can be located (play b, FIG. 7) and returned toward the starting-end of the stroke as represented in FIG. 1.

During this return movement, first the lug 206 is removed from the slider 230, the unit thus resuming a so-called "preferential tape travel direction" (FIG. 5), then the movable frame 140 is moved back to its position in which the magnetic tape and the cassette are free from any engagement with the playback/recording element 45 and tape driving means (pinch rollers 168, capstans 190,191) as shown in FIG. 4. When the stud 148 exits from the groove 152 resilient means 179 keep the movable frame 140 in the position shown in FIG. 4.

Simultaneously, the ratchet 100 is pivoted counter-clockwise by the pin spring 104 and locks the lug 114. Under power supplied by the motor M, the control member continues to move and drives the loading/unloading mechanism 20 which returns the tray 22 to the loading position shown in FIG. 1. The cassette then can be grasped by a user.

Accordingly, only one motor, such as motor M, and only one element, such as the control member 96, are required to power all the mechanisms of the unit to perform all operating functions. Further, control buttons or other manual control elements can be located at any desired position, local or remote, as the single source of power to be controlled is the motor 11.

I claim:

1. A playback/recording apparatus which operates with a recording tape medium, said apparatus comprising:

playback/recording means and tape driving means each mounted on one of fixed and movable frames, relative movement between the fixed and movable frames providing different tape operating modes, a loading/unloading mechanism which loads and unloads the tape medium between a loading/unloading position and an operating position associated with the playback/recording means and tape driving means, a single power source, a mobile control element which is driven by the power source along a linear path in forward and return stroke movements, the power source being controllable to move the mobile control element through a loading/unloading phase and to different operating locations along its linear path during an operating mode phase in which the playback/recording means and tape driving means are actuated to provide playback/recording at normal speed, pause, and fast speed, which are the different tape operating modes, means for selectively connecting the mobile control element to operate the loading/unloading mechanism in the course of the loading/unloading phase of the forward and return stroke movements to load and unload a tape medium, and a connection between the mobile control element and the movable frame which causes the movable frame to follow the forward and return stroke movements of the mobile control element during the operating mode phase and enables the mobile control element to shift the movable frame to different operating locations and set the playback/recording means and tape driving means in the different tape operating modes responsive to movement of the mobile control element to its different operating locations, each of the different operating locations of the mobile control element during the operating mode phase corresponding to one of the different tape operating modes, the mobile control element being movable in forward and reverse strokes directly from one operating location to another and being enabled by the connection during the operating mode phase to shift the movable frame and the playback/recording means and tape driving means directly from one tape operating mode to another.

2. The apparatus according to claim 1 wherein the single power source is a reversible motor driving the mobile control element through a mechanical drive train.

3. The apparatus according to claim 1 wherein said means for selectively connecting the mobile control element to operate the loading/unloading mechanism includes a pivotally mounted ratchet which is selectively moved responsive to movement of the mobile control element to lock and unlock the loading/unloading mechanism to move with the mobile control element.

4. The apparatus according to claim 1 wherein the movable frame is guided for translation perpendicular to its linear path of the mobile control element and is shifted to its different operating locations responsive to forward and return stroke movements of the mobile control element to its different operating locations to set the playback/recording means and tape driving means in the corresponding operating modes.

5. The apparatus according to claim 1 including a reversal mechanism which is operated by the mobile control element responsive to movement to certain of its operating locations to reverse travel direction of the tape medium.

6. The apparatus according to claim 5 wherein the reversal mechanism is driven by a movable slider and the mobile control element engages said slider in the course of its movement which sets the playback/recording and tape driving means in different relative positions so as to shift tape travelling direction when pinch rollers and a recording/playback head of the playback/recording and tape driving means are removed from their full operative position.

7. The apparatus according to claim 1 wherein the connection includes a cam groove having straight and angled sections, and the mobile control element carries a stud which moves along the straight and angled sections of the cam groove after the movement of the mobile control element along the loading/unloading phase of its movement and shifts the movable frame to set the playback/recording means and tape driving means in the different operating modes responsive to movement of the stud along the angled sections between different locations along the straight sections of the cam groove.

8. The apparatus according to claim 1 wherein the power source is operable to fully and directly return the mobile control element to a starting-end of its linear path from any of its operating locations responsive to an unload instruction.

9. The apparatus according to claim 1 wherein the mobile control element is directly movable from any one operating location to another responsive to a mode change instruction to the power source.

10. A playback/recording apparatus which operates with a recording tape medium, said apparatus comprising:

playback/recording means and tape driving means each mounted on one of fixed and movable frames, the movable frame being carried and guided for translation movement on the fixed frame, a loading/unloading mechanism which loads and unloads the tape medium between a loading/unloading position and an operating position associated with the playback/recording means and tape driving means, a single power source, a mobile control element which is movable by the power source along a path in forward and return stroke movements, means for selectively connecting the mobile control element to operate the loading/unloading mechanism during a loading/unloading phase of the forward and return stroke movements to load and unload a tape medium, a connection between the mobile control element and the movable frame during an operating mode phase of the forward and return stroke movements which enables the mobile control element to move the movable frame to different locations and set the playback/recording means and tape driving means in playback/recording at normal speed, pause, and fast speed operating modes, the connection including a cam and member which follows the cam and causes the movable frame to follow the forward and return stroke movements of the mobile control element, the cam defining the different movable frame locations which correspond, respectively, to the operating modes.

* * * * *